(12) United States Patent
Ong et al.

(10) Patent No.: US 6,458,911 B1
(45) Date of Patent: Oct. 1, 2002

(54) ETHYLENE POLYMER FILM RESINS

(75) Inventors: S. Christine Ong, Warren, NJ (US); Sandra D. Schregenberger, Bridgewater, NJ (US); Pradeep P. Shirodkar, Somerset, NJ (US)

(73) Assignee: ExxonMobil Oil Corporation, Fairfax, VA (US)

( * ) Notice: Subject to any disclaimer, the term of this patent is extended or adjusted under 35 U.S.C. 154(b) by 0 days.

(21) Appl. No.: 09/969,418

(22) Filed: Oct. 2, 2001

Related U.S. Application Data

(62) Division of application No. 08/083,866, filed on Jun. 28, 1993, now Pat. No. 6,316,546, which is a continuation of application No. 07/734,989, filed on Jul. 24, 1991, now abandoned, which is a continuation of application No. 07/665,054, filed on Mar. 6, 1991, now abandoned.

(51) Int. Cl.$^7$ .......................... C08F 10/02; C08F 10/04; C08L 23/04; C08L 23/08
(52) U.S. Cl. .................. 526/348.1; 526/352; 525/191; 525/240
(58) Field of Search ................ 525/240, 191; 526/348.1, 352

(56) References Cited

U.S. PATENT DOCUMENTS

| | | | |
|---|---|---|---|
| 4,048,412 A | 9/1977 | Caumartin et al. | 526/65 |
| 4,307,209 A | 12/1981 | Morita et al. | 525/246 |
| 4,338,424 A | 7/1982 | Morita et al. | 526/65 |
| 4,352,915 A | 10/1982 | Mashita et al. | 526/65 |
| 4,390,669 A | 6/1983 | Morita et al. | 526/65 |
| 4,414,369 A | 11/1983 | Kuroda et al. | 526/65 |
| 4,420,592 A | 12/1983 | Kato et al. | 526/65 |
| 4,461,873 A | 7/1984 | Bailey et al. | 525/240 |
| 4,481,301 A | 11/1984 | Nowlin et al. | 502/104 |
| 4,481,302 A | 11/1984 | McDaniel et al. | 526/352 |
| 4,547,551 A | * 10/1985 | Bailey et al. | 525/240 |
| 4,703,094 A | 10/1987 | Raufast | 526/65 |
| 4,888,318 A | 12/1989 | Allen et al. | 502/105 |
| 4,918,038 A | 4/1990 | Samuels et al. | 502/112 |
| 4,975,485 A | 12/1990 | Sato et al. | 525/324 |
| 5,126,398 A | 6/1992 | Lee et al. | 525/53 |
| 5,284,613 A | 2/1994 | Ali et al. | 264/566 |
| 5,688,865 A | 11/1997 | Ali et al. | 525/53 |

FOREIGN PATENT DOCUMENTS

EP  0369436  5/1990

OTHER PUBLICATIONS

Kirk–Othmer Encyclopedia of Chemical Technology, third edition, Herman F. Mark et al., editors, published by John Wiley & Sons, New York, vol. 16, pp. 388–389, 1981.
English Language Abstract of Japanese Patent Document JP59179507, dated Oct. 1984.
English Language Abstract of Japanese Patent Document JP59179508, dated Oct. 1994.

* cited by examiner

*Primary Examiner*—David W. Wu
*Assistant Examiner*—R. Rabago
(74) *Attorney, Agent, or Firm*—Stephen D. Prodnuk

(57) ABSTRACT

A class of relatively high molecular weight, high density ethylene polymers (HMW-HDPE) is disclosed capable of being formed into thin films of high strength, such polymers having a density of at least about 0.925 g/cc, a flow index ($I_{21}$) no higher than about 15 g/10 min., a melt flow ratio (MFR) of at least about 65, and a dynamic elasticity at 0.1 rad./sec. of no higher than about 0.7 at a corresponding complex viscosity at 0.1 rad./sec. no higher than about $14 \times 10^5$ poises. The ethylene polymer is a bimodal of relatively high molecular weight (HMW) and low molecular weight (LMW) ethylene polymers.

4 Claims, 1 Drawing Sheet

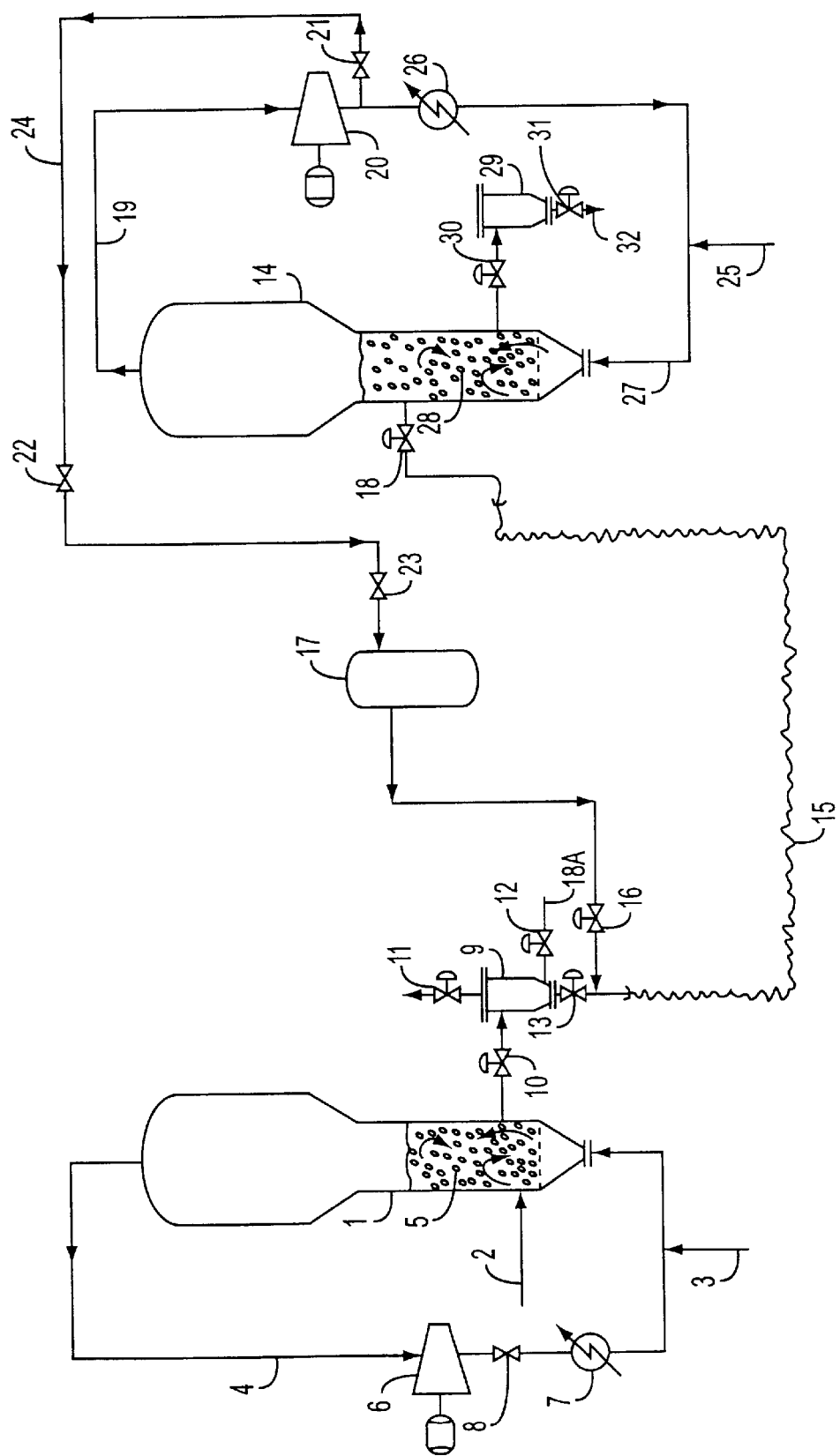

ETHYLENE POLYMER FILM RESINS

This application is a divisional of U.S. application Ser. No. 08/083,866, filed Jun. 28, 1993, now U.S. Pat. No. 6,316,546, which is a continuation of U.S. application Ser. No. 07/734,989, filed Jul. 24, 1991, now abandoned, which is a continuation-in-part of U.S. application Ser. No. 07/665,054, filed Mar. 6, 1991, now abandoned, the disclosures of which are incorporated herein by reference in their entirety.

BACKGROUND OF THE INVENTION

1. Field of the Invention

This invention relates to relatively high molecular weight, high density ethylene polymers capable of being formed with good processability into films having improved mechanical properties.

2. Description of Related Art

The following information is disclosed in accordance with the terms of 37 CFR 1.56, 1.97 and 1.98.

U.S. Pat. No. 4,307,209, issued Dec. 22, 1981, to Morita et al., discloses a process for producing bimodal ethylene polymers in two slurry stages in the presence of a catalyst comprising titanium, magnesium and halogen, with the polymer of the first stage being different in intrinsic viscosity and alpha-olefin comonomer content, and with the second stage carried out in the presence of the polymer of the first stage.

U.S. Pat. No. 4,352,915, issued Oct. 5, 1982, to Mashita et al., discloses a process for producing bimodal ethylene homopolymers or ethylene-alpha-olefin copolymers in two slurry stages in the presence of a catalyst comprising a titanium and/or vanadium compound supported on a specified magnesium compound, and wherein a relatively low molecular weight component is produced in the first stage and a relatively high molecular weight component is produced in the second stage.

U.S. Pat. No. 4,414,369, issued Nov. 8, 1983, to Kuroda et al., discloses a process for the production of bimodal polyolefins wherein olefin monomers are polymerized in a first stage in the presence of a Ziegler catalyst to produce a relatively high molecular weight polymer which is transferred to a second stage wherein further polymerization to a relatively low molecular weight polymer is effected, resulting in a final polymer having a wide molecular weight distribution.

U.S. Pat. Nos. 4,461,873, issued Jul. 24, 1984, and 4,547,551, issued Oct. 15, 1985, both to F. W. Bailey et al., each discloses blends of high molecular weight and low molecular weights ethylene polymers of purportedly narrow molecular weight distribution, useful in the production of films and blow-molded articles.

U.S. Pat. No. 4,048,412, issued Sep. 13, 1977, to Caumartin et al., discloses a process for the polymerization of olefins, e.g., ethylene, in a series of reaction vessels each operating in the gas phase and containing a fluidized bed of polymer and catalyst comprising a transition metal and organometallic compound as cocatalyst introduced into the first reactor, and wherein an additional amount of cocatalyst is introduced into a reactor other than the first. The patent discloses the use of different organoaluminum compounds as cocatalysts in the reactors for the purpose of varying the molecular weight distribution of the polymer.

U.S. Pat. No. 4,338,424, issued Jul. 6, 1982, to Morita et al., discloses a process for polymerizing olefins utilizing two gas phase polymerization zones, the first employing a higher hydrogen to olefin mole ratio to produce a low molecular weight (LMW) polymer and the second employing a lower hydrogen to olefin mole ratio to produce a high molecular weight (HMW) polymer. The process also includes a dilution zone between the two polymerization zones to which a fresh supply of olefin gas is added for feeding into the second polymerization zone.

U.S. Pat. No. 4,390,669, issued Jun. 28, 1983, to Morita et al., teaches the production of polyolefins utilizing two gas phase polymerization zones with the polymer from the first zone being fed to a suspension zone wherein it is suspended in a liquid hydrocarbon medium and the liquid suspension is fed to the second zone. A LMW polymer is produced in the first zone and a HMW polymer in the second zone.

U.S. Pat. No. 4,420,592, issued Dec. 13, 1983, to Kato et al., discloses the polymerization of olefins in the gas phase in a multiplicity of polymerization zones wherein a gaseous stream containing polymer from the first zone is fed to the second zone through a transfer passage containing an inert gas zone in which part of the gas components from the first zone is replaced by an inert gas. The disclosure is limited to the production of LMW polymer in the first zone and HMW polymer in the second zone.

U.S. Pat. No. 4,703,094, issued Oct. 27, 1987, to Raufast, discloses the production of polyolefins by the polymerization of alpha-olefins in the gas phase in several reactors, at least two of which are interconnected by a transfer device in which the gas mixture from the upstream reactor is subjected to decompression and compression stages, providing for elimination of the heat of reaction and degassing of the polymer powder.

U.S. Pat. No. 4,481,301, issued Nov. 6, 1984, to Nowlin et al., discloses catalysts for polymerizing alpha-olefins prepared by treating a support with an organomagnesium compound and contacting the supported magnesium composition in a liquid medium with a tetravalent titanium compound.

U.S. Pat. No. 4,888,318, issued Dec. 19, 1989, to Allen et al., discloses catalysts for the polymerization of alpha-olefins prepared by reacting a supported complex of titanium and magnesium with trimethyl aluminum.

European Published Patent Application No. 0 369 436, of Lee et al., published May 23, 1990, discloses a process for the production of ethylene copolymers in the gas phase utilizing at least two fluidized bed reactors in series under conditions such that a high melt index copolymer is made in one reactor and a low melt index copolymer in the other. The disclosure states that the high and low melt index polymers can be made in any order. The catalyst employed is a complex of magnesium, titanium, a halogen, and an electron donor on an appropriate support such as a silica or alumina, in combination with an organoaluminum activator and co-catalyst.

SUMMARY OF THE INVENTION

In accordance with this invention, relatively high molecular weight, high density ethylene polymers (HMW-HDPE) capable of being formed into thin films of high strength are provided, such polymers having a density of at least about 0.925 g/cc, a flow index ($I_{21}$) no higher than about 15 g/10 min., a melt flow ratio (MFR) of at least about 65, and a dynamic elasticity (as defined hereinafter) at 0.1 rad./sec. of no higher than about 0.70 at a corresponding complex viscosity at 0.1 rad./sec. no higher than about 14E5, i.e., about $14 \times 10^5$ poises.

The ethylene polymer of this invention will in most cases consist essentially of a bimodal blend of relatively high molecular weight (HMW) and low molecular weight (LMW) ethylene polymers with the HMW component present, for example, at a weight fraction of at least about 0.5 of such ethylene polymer content and having a density of at least about 0.910 g/cc, a flow index ($I_{21}$) of, for example, no higher than about 0.8 g/10 min., a relatively narrow molecular weight distribution indicated by a flow ratio (FR), for example, no higher than about 15, and a dynamic elasticity at 0.1 rad./sec., for example, of no higher than about 0.75 at a corresponding complex viscosity at 0.1 rad./sec. of no higher than about 7E6, i.e., 7×10$^6$ poises, and the LMW component having a density of at least about 0.940 g/cc and a melt index ($I_2$) of at least about 100 g/10 min.

The HMW-HDPE product of this invention having relatively low elasticity and molecular weight distribution indicated by MFR, can be formed with good processability into thin gauge films having excellent mechanical properties, e.g., Dart Drop Impact and Elmendorf Tear resistance, despite the fact that its short chain branching, e.g., ethyl groups per 1000 C atoms, appears to be higher in the LMW component than in the HMW component. This is contrary to a prevailing belief that short chain branching should be concentrated in the HMW component for optimum mechanical properties of films.

BRIEF DESCRIPTION OF THE DRAWING

The drawing is a schematic diagram of a gas phase tandem polymerization process which can be used to make the products of this invention.

DETAILED DESCRIPTION OF THE INVENTION

The ethylene polymer of this invention preferably consists essentially of either 1) a homopolymer of ethylene; 2) at least one copolymer of a preponderance of ethylene with a minor amount of a 1-olefin containing 3 to about 10 carbon atoms, e.g., 1-butene, 1-pentene, 1-hexene, 4-methyl-1-pentene, 1-octene, 1-decene, and mixtures thereof; or 3) a mixture of any of the foregoing polymers. In general, the polymer product will comprise an amount of polymerized comonomer which is in the range, for example, of about 0 to 30 weight percent, based on the total weight of polymer.

The density of the ethylene polymer product of this invention will generally be, for example, at least about 0.925 g/cc, preferably about 0.940 to 0.96C g/cc, and most preferably about 0.943 to 0.952 g/cc.

The flow index or high load melt index of the ethylene polymer of this invention ($I_{21}$, measured at 190° C. in accordance with ASTM D-1238, Condition F) is generally no higher than about 15, preferably from about 4 to 12, and most preferably about 5 to 10 g/10 min., while the melt flow ratio (MFR), defined as the ratio of flow index ($I_{21}$) to melt index ($I_2$), measured at 190° C. in accordance with ASTM D-1238, Condition E, is at least about 65, preferably about 75 to 180, and most preferably about 80 to 150.

The dynamic elasticity of the polymer product of the invention is no higher than about 0.7 at 0.1 rad./sec. at a corresponding complex viscosity of no higher than about 14E5 (14×10$^5$ poises) at 0.1 rad./sec., preferably about 0.45 to 0.65 at a corresponding complex viscosity of about 6E5 to 14E5, and most preferably about 0.45 to 0.60 at a corresponding complex viscosity of about 7E5 to 14E5.

The dynamic elasticity as used herein is defined as the ratio of the storage modulus G'(w) to the loss modulus G"(w). The following definitions of these moduli were adapted from those given in J. D. Ferry, *Viscoelastic Properties of Polymers,* 3rd Edition (New York: John Wiley & Sons, 1980) 41–42. The definitions pertain to measurements made in small strain oscillatory measurements.

Storage Modulus, G'(w), is defined as the stress in phase with the strain in a sinusoidal shear deformation divided by the strain. It is a measure of the energy stored and recovered per cycle, when different systems are compared at the same strain amplitude. It is a function of the oscillating frequency w.

Loss Modulus, G"(w), is defined as the stress 90 degrees out of phase with the strain divided by the strain. It is a measure of the energy dissipated or lost per cycle of sinusoidal deformation, when different systems are compared at the same strain amplitude. It is also a function of the oscillating frequency w.

Complex Viscosity is derived from G'(w) and G"(w) as hereinbefore defined using the following equation:

$$\text{Complex Viscosity} = \sqrt{\left(\frac{G'(w)}{w}\right)^2 + \left(\frac{G''(w)}{w}\right)^2}$$

As stated, the ethylene polymer of this invention will in most cases consist essentially of a bimodal blend of relatively high molecular weight (HMW) and low molecular weight (LMW) ethylene polymers with the HMW component being present, for example, at a weight fraction of at least about 0.5 of the ethylene polymer content. Such HMW component is preferably present at a weight fraction of about 0.5 to 0.65, more preferably about 0.51 to 0.60, with the remainder of the ethylene polymer being the LMW component. In addition, the HMW component will generally have a density of at least about 0.910 g/cc, preferably about 0.920 to 0.935 g/cc, and more preferably about 0.924 to 0.935 g/cc; a flow index or high load melt index ($I_{21}$) of no higher than about 0.8, preferably from about 0.15 to 0.7, and more preferably about 0.2 to 0.6 g/10 min.; a flow ratio (FR, defined as the ratio of flow index ($I_{21}$) to intermediate load melt index [$I_5$], measured at 190° C. under a load of 5 kilograms in accordance with ASTM D-1238, Condition P) of no higher than about 15, preferably about 8 to 14, and more preferably about 9 to 13; and a dynamic elasticity no higher than about 0.75 at 0.1 rad./sec. at a corresponding complex viscosity of no higher than about 7E6 (7×10$^6$ poises), at 0.1 rad./sec., preferably about 0.45 to 0.7 at a corresponding complex viscosity of about 2E6 to 6E6, and more preferably about 0.5 to 0.65 at a corresponding complex viscosity of about 3E6 to 6E6.

The LMW component will generally have a density of at least about 0.940 g/cc, preferably about 0.945 to 0.970 g/cc, and most preferably about 0.950 to 0.970 g/cc, and a melt index ($I_2$) of at least about 100 g/10 min., preferably about 200 to 2000 g/10 min., and more preferably about 300 to 1500 g/10 min.

The ethylene polymer product of this invention is capable of being formed into thin gauge films, e.g., of up to 1.5 mil., of superior mechanical properties, e.g., an Elmendorf tear resistance in the machine direction (MD Tear, ASTM D1922) of at least about 10 g/mil, preferably about 15 to 60 g/mil, and more preferably about 20 to 60 g/mil, and a Dart Drop Impact resistance ($F_{50}$, ASTM D1709) of at least about 200 g, preferably about 200 to 600 g, and more preferably about 250 to 600 g.

When the ethylene polymer of this invention consists essentially of HMW and LMW ethylene polymer components as previously described, such components may be prepared separately and physically blended in a conventional manner, e.g., by initially dry blending the resin in a mixer with suitable additives, and then melt blending it in an extruder. The relative proportions of the HMW and LMW components are such that the blending produces an ethylene polymer product having the desired properties of density, flow index ($I_{21}$), melt flow ratio (MFR), and dynamic elasticity as set out hereinbefore. Preferably, however, the desired bimodal ethylene polymer blend is directly produced by means of a gas phase, fluidized bed, tandem reactor process as described hereinafter in this specification and in parent application Ser. No. 07/665,054, filed Mar. 6, 1991, by A. H. Ali et al., now abandoned, the entire disclosure of which is incorporated by reference. Whichever method is used, the described desirable properties of the ethylene polymer obtained are dependent on the catalyst used to polymerize both components and particularly the HMW component, as well as the process conditions.

In utilizing a gas phase, fluidized bed, tandem reactor process to obtain the product of this invention, bimodal ethylene polymer blends having the described combination of good processability and superior mechanical properties are produced by a process including the steps of polymerizing gaseous monomeric compositions comprising a major proportion of ethylene in at least two gas phase, fluidized bed reactors operating in the tandem mode under the following conditions. In the first reactor, a gas comprising monomeric composition and, optionally, a small amount of hydrogen, is contacted under polymerization conditions with an appropriate Ziegler-Natta or coordination catalyst as described more fully hereinafter, comprising a transition metal compound as primary catalyst component and a reducing agent such as an organometallic compound as cocatalyst, at a hydrogen/ethylene molar ratio of no higher than about 0.3 and an ethylene partial pressure no higher than about 100 psia such as to produce a relatively high molecular weight (HMW) polymer powder wherein the polymer is deposited on the catalyst particles. The HMW polymer powder containing the catalyst is then transferred to a second reactor with, optionally, additional cocatalyst which may be the same or different from the cocatalyst utilized in the first reactor but with no additional transition metal catalyst component, together with a gaseous mixture comprising hydrogen and monomeric composition wherein additional polymerization is carried out at a hydrogen/ethylene molar ratio of at least about 0.9, the ratio being sufficiently high such that it is at least about 8.0 times that in the first reactor, and an ethylene partial pressure at least 1.2 times that in the first reactor, to produce a relatively low molecular weight (LMW) polymer much of which is deposited on and within the HMW polymer/catalyst particles from the first reactor, such that the fraction of HMW polymer in the bimodal polymer leaving the second reactor is at least about 0.5.

The foregoing conditions provide for a process wherein the production of fines tending to foul compressors and other equipment is kept to a relatively low level. Moreover, such conditions provide for an inhibited level of productivity in the first reactor with a resulting increased level of productivity in the second reactor to produce a bimodal polymer blend having properties as previously described and a high degree of homogeneity (indicated by low level of gels) caused by a substantial degree of blending of HMW and LMW polymer in each final polymer particle inherently resulting from the process operation. The bimodal blend is capable of being processed without undue difficulty into films having a superior combination of mechanical properties.

The gaseous monomer entering both reactors may consist wholly of ethylene or may comprise a preponderance of ethylene and a minor amount of a comonomer such as a 1-olefin containing 3 to about 10 carbon atoms. Comonomeric 1-olefins which may be employed are, for example, 1-butene, 1-pentene, 1-hexene, 4-methyl-1-pentene, 1-octene, 1-decene, and mixtures thereof. The comonomer may be present in the monomeric compositions entering either or both reactors.

In many cases, the monomer composition will not be the same in both reactors. For example, the monomer entering the first reactor may contain a minor amount of comonomer such as 1-hexene so that the HMW component of the bimodal product is a copolymer, while the monomer fed to the second reactor may consist essentially of ethylene so that the LMW component of the product is substantially an ethylene homopolymer. The amount of comonomer may be in the range, for example, of about 0 to 30, preferably about 0 to 20 weight percent, based on the total weight of polymer produced in the tandem process.

Hydrogen may or may not be used to modulate the molecular weight of the HMW polymer made in the first reactor. Thus, hydrogen may be fed to the first reactor such that the molar ratio of hydrogen to ethylene ($H_2/C_2$ ratio) is, for example, up to about 0.3, preferably about 0.005 to 0.2. In the second reactor it is necessary to produce a LMW polymer with a low enough molecular weight and in sufficient quantity so as to produce a bimodal resin which can be formed, with a minimum of processing difficulties, into films having a superior combination of mechanical properties. For this purpose, hydrogen is fed to the second reactor with the ethylene containing monomer such that the hydrogen to ethylene mole ratio in the gas phase is at least about 0.9, preferably in the range of about 0.9 to 5.0 and most preferably in the range of about 1.0 to 3.5. Moreover, to provide a sufficient difference between the molecular weights of the polymers in the first and second reactor so as to obtain a bimodal resin product having a wide enough molecular weight distribution necessary for the desired levels of processability and mechanical properties, the hydrogen to ethylene mole ratios in the two reactors should be such that the ratio in the second reactor is at least about 8.0 times the ratio in the first reactor, for example in the range 8.0 to 10,000 times such ratio, and preferably 10 to 200 times the ratio in the first reactor.

Utilizing the hydrogen to ethylene ratios set out previously to obtain the desired molecular weights of the HMW and LMW polymers produced in the first and second reactors respectively tends to result in relatively high polymer productivity in the first reactor and relatively low productivity in the second reactor. This tends to result in turn in a bimodal polymer product containing too little LMW polymer to maintain satisfactory processability. A significant part of this invention lies in the discovery that this effect can be largely overcome by employing ethylene partial pressures in the two reactors so as to reduce the polymer productivity in the first reactor and raise such productivity in the second reactor. For this purpose, the ethylene partial pressure employed in the first reactor is no higher than about 100 psia, for example in the range of about 15 to 100 psia, preferably in the range of about 20 to 80 psia and the ethylene partial pressure in the second reactor is, for example in the range of about 26 to 170 psia, preferably about 55 to 120 psia, with the ethylene partial pressures in any specific process being such that the ratio of ethylene partial pressure in the second to that in the first reactor is at least about 1.2, preferably about 1.25 to 7.0, and more preferably about 1.25 to 4.0

If desired for any purpose, e.g., to control superficial gas velocity or to absorb heat of reaction, an inert gas such as nitrogen may also be present in one or both reactors in addition to the monomer and hydrogen. Thus the total pressure in both reactors may be in the range, for example, of about 100 to 600 psig, preferably about 200 to 350 psig.

The temperature of polymerization in the first reactor may be in the range, for example, of about 60 to 130° C., preferably about 60 to 90° C., while the temperature in the second reactor may be in the range, for example, of about 80 to 130° C., preferably about 90 to 120° C. For the purpose of controlling molecular weight and productivity in both reactors, it is preferred that the temperature in the second reactor be at least about 10° C. higher, preferably about 20 to 60° C. higher than that in the first reactor.

The residence time of the catalyst in each reactor is controlled so that the productivity is suppressed in the first reactor and enhanced in the second reactor, consistent with the desired properties of the bimodal polymer product. Thus, the residence time may be, for example, about 0.5 to 6 hours, preferably about 1 to 3 hours in the first reactor, and, for example, about 1 to 12 hours, preferably about 2.5 to 5 hours in the second reactor, with the ratio of residence time in the second reactor to that in the first reactor being in the range, for example, of about 5 to 0.7, preferably about 2 to 0.8.

The superficial gas velocity through both reactors is sufficiently high to disperse effectively the heat of reaction so as to prevent the temperature from rising to levels which could partially melt the polymer and shut the reactor down, and high enough to maintain the integrity of the fluidized beds. Such gas velocity may be in the range, for example, of about 40 to 120, preferably about 50 to 90 cm/sec.

The productivity of the process in the first reactor in terms of grams of polymer per gram atom of transition metal in the catalyst multiplied by $10^6$, may be in the range, for example, of about 1.6 to 16.0, preferably about 3.2 to 9.6; in the second reactor, the productivity may be in the range, for example, of about 0.6 to 9.6, preferably about 1.6 to 3.5, and in the overall process, the productivity is in the range, for example, of about 2.2 to 25.6, preferably about 4.8 to 16.0. The foregoing ranges are based on analysis of residual catalyst metals in the resin product.

If it is desired to prepare the HMW and LMW components separately and subsequently physically blend them, each component may be produced in a single stage gas phase fluidized bed reactor employing process conditions within the ranges described for the two reactors utilized in the foregoing gas phase tandem reactor process. In either case, the specific process conditions are chosen in combination with an appropriate catalyst and weight fractions of the two components so as to obtain a final bimodal polymer having the desired combination of properties.

One suitable class of Ziegler-Natta catalysts for the preparation of the polymer products of this invention comprises:

(i) a catalyst precursor complex or mixture of complexes consisting essentially of magnesium, titanium, a halogen, and an electron donor as hereinafter defined supported on an inorganic porous carrier; and (ii) at least one hydrocarbyl aluminum cocatalyst.

The titanium based complex or mixture of complexes is exemplified by an empirical formula $Mg_aTi(OR)_bX_c(ED)_d$ wherein R is an aliphatic or aromatic hydrocarbon radical having 1 to 14 carbon atoms or COR' wherein R' is an aliphatic or aromatic hydrocarbon radical having 1 to 14 carbon atoms; each OR group is alike or different; X is Cl, Br, or I, or mixtures thereof; ED is an electron donor, which is a liquid Lewis base in which the precursors of the titanium based complex are soluble; a is 0.5 to 56; b is 0, 1, or 2; c is 1 to 116, particularly 2 to 116; and d is 2 to 85. The complex is formed by reacting appropriate titanium and magnesium compounds in the presence of an electron donor.

A titanium compound which can be used to prepare the foregoing complex has the formula $Ti(OR)_aX_b$ wherein R and X are as defined for component (i) above; a is 0, 1 or 2; b is 1 to 4; and a+b is 3 or 4. Suitable compounds are $TiCl_3$, $TiCl_4$, $Ti(OC_6H_5)Cl_3$, $Ti(OCOCH_3)Cl_3$ and $Ti(OCOC_6H_5)Cl_3$.

A magnesium compound which may be reacted with the foregoing titanium compound to form the complex has the formula $MgX_2$ wherein X is as defined for component (i) above. Suitable examples are $MgCl_2$, $MgBr_2$, and $MgI_2$. Anhydrous $MgCl_2$ is a preferred compound. About 0.5 to 56, and preferably about 1 to 10, moles of the magnesium compound are used per mole of titanium compound.

The electron donor present in the catalyst composition is an organic compound, liquid at temperatures in the range of about 0° C. to about 200° C. It is also known as a Lewis base. The titanium and magnesium compounds are both soluble in the electron donor.

Electron donors can be selected from the group consisting of alkyl esters of aliphatic and aromatic carboxylic acids, aliphatic ketones, aliphatic amines, aliphatic alcohols, alkyl and cycloalkyl ethers, and mixtures thereof, each electron donor having 2 to 20 carbon atoms. Among these electron donors, the preferred are alkyl and cycloalkyl ethers having 2 to 20 carbon atoms, dialkyl, diaryl, and alkyaryl ketones having 3 to 20 carbon atoms; and alkyl, alkoxy, and alkylalkoxy esters of alkyl and aryl carboxylic acids having 2 to 20 carbon atoms. The most preferred electron donor is tetrahydrofuran. Other examples of suitable electron donors are methyl formate, ethyl acetate, butyl acetate, ethyl ether, dioxane, di-n-propyl ether, dibutyl ether, ethyl formate, methyl acetate, ethyl anisate, ethylene carbonate, tetrahydropyran, and ethyl propionate.

The cocatalyst may, for example, have the formula $AlR''_eX'_fH_g$ wherein X'' is Cl or OR'''; R'' and R''' are saturated aliphatic hydrocarbon radicals having 1 to 14 carbon atoms and are alike or different; f is 0 to 1.5; g is 0 or 1; and e+f+g=3. Examples of suitable R, R', R'', and R''' radicals are: methyl, ethyl, propyl, isopropyl, butyl, isobutyl, tert-butyl, pentyl, neopentyl, hexyl, 2-methylpentyl, heptyl, octyl, isooctyl, 2-ethyhexyl, 5,5-dimethylhexyl, nonyl, isodecyl, undecyl, dodecyl, cyclohexyl, cycloheptyl, and cyclooctyl. Examples of suitable R and R' radicals are phenyl, phenethyl, methyloxyphenyl, benzyl, tolyl, xylyl, naphthyl, and methylnaphthyl. Some examples of useful cocatalyst are triisobutylaluminum, trihexlyaluminum, di-isobutylaluminum hydride, dihexylaluminum hydride, di-isobutylhexylaluminum, trimethylaluminum, triethylaluminum, diethylaluminum chloride, $Al_2(C_2H_5)_3Cl_3$, and Al $(C_2H_5)_2(OC_2H_5)$.

Silica is the preferred support for the catalyst precursor. Other suitable inorganic oxide supports are aluminum phosphate, alumina, silica/alumina mixtures, silica pretreated with an organoaluminum compound such as triethylaluminum, and silica modified with diethylzinc, such modifier being used in a quantity sufficient to react with the hydroxyl groups on the support which otherwise tend to react with and deactivate part of the titanium in the catalyst, but not in sufficient quantity to function as a cocatalyst. A typical support is a solid, particulate material essentially inert to the polymerization. It is used as a dry powder having an average particle size of about 10 to 250 microns and preferably about 30 to about 100 microns; a surface area of at least about 3 square meters per gram and preferably at least about 50 square meters per gram; and a pore size of at least about 80 Angstroms and preferably at least about 100 Angstroms. Generally, the amount of support used is that which will provide about 0.01 to about 0.5, and preferably about 0.2 to about 0.35 millimole of transition metal per gram of support. Impregnation of the abovementioned catalyst precursor into, for example, silica is accomplished by mixing the complex and silica gel in the electron donor solvent followed by solvent removal under reduced pressure and/or elevated temperature.

In preparing the polymer by the gas phase tandem reactor process, it is preferred that the titanium/magnesium precursor not be combined with the hydrocarbyl aluminum cocatalyst prior to being fed to the first reactor, but that these components be fed to such reactor separately, and that an additional quantity of the hydrocarbyl aluminum cocatalyst be fed to the second reactor in an amount sufficient to increase catalyst activity in the second reactor. However, in such a tandem reactor process, it is not necessary to prereduce or activate the titanium/magnesium complex with an amount of cocatalyst prior to feeding the complex to the first reactor. The cocatalyst is fed to each reactor neat or as a solution in an inert solvent such as isopentane.

In preparing the HMW and LMW components separately in gas phase reactors, the titanium/magnesium complex may be partially activated with cocatalyst prior to being fed to the reactor. In this case the cocatalyst used for the partial activation may be the same or different from that fed separately to each reactor. Preferred cocatalysts for partial activation of the titanium/magnesium complex prior to its being fed to the reactor are tri-n-hexylaluminum, diethylaluminum chloride, triethylaluminum and triisobutylaluminum, or a mixture of any of these.

Broad, exemplary ranges and preferred ranges of molar ratios of various components of the foregoing catalyst systems utilizing titanium/magnesium complexes are as follows:

TABLE I

| | Catalyst Components | Broad Exemplary Range | Preferred Range |
|---|---|---|---|
| 1. | Mg:Ti | 0.5:1 to 56:1 | 1.5:1 to 5:1 |
| 2. | Mg:X | 0.005:1 to 28:1 | 0.075:1 to 1:1 |
| 3. | Ti:X | 0.01:1 to 0.5:1 | 0.05:1 to 0.2:1 |
| 4. | Mg:ED | 0.005:1 to 28:1 | 0.15:1 to 1.25:1 |
| 5. | Ti:ED | 0.01:1 to 0.5:1 | 0.1:1 to 0.25:1 |
| 6. | Cocatalyst used as Partial Activator:Ti | 0:1 to 50:1 | 0:1 to 5:1 |
| 7. | Total Cocatalyst:Ti | 0.6:1 to 250:1 | 11:1 to 105:1 |
| 8. | ED:Al | 0.05:1 to 25:1 | 0.2:1 to 5:1 |

Specific examples of the described catalysts comprising a titanium/magnesium complex, and methods for their preparation are disclosed, for example, in U.S. Pat. Nos. 3,989,881; 4,124,532; 4,174,429; 4,349,648; 4,379,759; 4,719,193; and 4,888,318; and European Patent application Publication Nos. 0 012 148; 0 091 135; 0 120 503; and 0,369,436; and the entire disclosures of these patents and publications pertaining to catalysts are incorporated herein by reference.

Another class of catalysts which may be used in the process of this invention is prepared by treating a previously dried, solid, inorganic, porous carrier containing OH groups, e.g., silica, with a liquid, e.g., tetrahydrofuran, containing a hydrocarbyl magnesium, e.g. ethylmagnesium chloride, evaporating liquid from the so-treated carrier leaving a magnesium precipitate on the carrier surface, and contacting the resulting powder with a solution of transition metal compound, e.g., a tetravalent titanium compound such as titanium tetrachloride, to form a transition metal/Mg complex or mixture of complexes on the surface of the carrier. The carrier may be initially dried in the presence of an oxygen-containing gas such as air rather than an inert gas such as nitrogen. The resulting supported transition metal/Mg complex may be utilized with a hydrocarbyl aluminum cocatalyst as disclosed previously with other Ti/Mg complexes, added to the first or both reactors. If hydrocarbyl aluminum cocatalysts are added to both reactors, they may be the same or different. Various catalysts of this type and methods of preparing them are described in U.S. Pat. Nos. 4,481,301 and 4,562,169, the entire disclosures of which are incorporated herein by reference.

The amount of cocatalyst utilized in the Ziegler-Natta catalyst employed in the process of making the products of this invention whether for pre-reduction or activation of the catalyst prior to polymerization or added to the sole reactor or the first reactor of a tandem reactor process or both, is generally in the range, for example, of about 2 to 100 gram atoms of cocatalyst metal, e.g., aluminum, per gram atom of transition metal, e.g., titanium, preferably about 5 to 50 gram atoms of cocatalyst metal per gram atom of transition metal. Any amount of cocatalyst added to the second reactor is not included in the foregoing ranges. However, it is preferred that additional cocatalyst be fed to the second reactor to increase catalyst activity.

Referring now to the drawing, catalyst component containing transition metal, e.g. titanium, is fed into first reactor 1 through line 2. Ethylene, comonomer, e.g., 1-hexene, if used, hydrogen, if used, inert gas such as nitrogen, if used, and cocatalyst, e.g. triethylaluminum (TEAL), are fed through line 3 into recycle line 4 where they are combined with recycle gas and fed into the bottom of reactor 1. The gas velocity is high enough and the size and density of the particles in reactor 1 are such as to form a fluidized or dense bed 5 comprising catalyst particles associated with polymer formed by the polymerization of ethylene and, if present, comonomer within reactor 1. The conditions in reactor 1, e.g. partial pressure of ethylene, hydrogen/ethylene molar ratio, temperature, total pressure, etc. are controlled such that the polymer which forms is of relatively high molecular weight (HMW). Recycle gas leaving the top of reactor 1 through line 4 is recompressed in compressor 6, cooled in heat exchanger 7 after passing through valve 8 and are fed to the bottom of reactor 1 after being optionally combined with make-up gases and cocatalyst from line 3 as described.

Periodically, when sufficient HMW polymer has formed in reactor 1, the polymer and catalyst 1 are transferred to discharge tank 9 by opening valve 10 while valves 11, 12 and 13 remain closed. When an amount of the HMW polymer and catalyst from reactor 1 which is desired to be transferred has been fed to discharge tank 9, the transfer system to second reactor 14 is activated by opening valve 13 to force the HMW polymer and catalyst into transfer hose 15. Valve 13 is then closed to isolate transfer hose 15 from discharge tank 9 and valve 11 is opened, ensuring that any gases leaking through valve 13 are vented and do not back-leak across valve 10 into reactor 1. Transfer hose 15 is then pressurized with reactor-cycle gas from reactor 14 by opening valve 16. To minimize upsets in reactor 14, surge vessel 17 is used to store gas for pressuring transfer hose 15. With valve 16 still in the open position, valve 18 is opened to convey HMW polymer and catalyst into reactor 14. Both valves 16 and 18 are left open for a period to sweep transfer hose 15. Valves 18 and 16 are then closed sequentially. Transfer hose 15 is then vented by opening valve 13, valve 11 having remained open during the transfer operation. Discharge tank 9 is then purged with purified nitrogen through line 18A by opening valve 12.

During the transfer, cycle gas comprising hydrocarbons and hydrogen leaves reactor 14 through line 19, is compressed by compressor 20, flows through valves 21, 22 and 23 in line 24 and through surge tank 17, valve 16 and pressurized transfer hose 15 as described, thus effecting the transfer of HMW polymer and catalyst to reactor 14.

After the transfer to reactor 14 is effected, the flow of gas from reactor 14 to transfer hose 15 is stopped by closing valves 21, 22, 23 and 16. Ethylene, hydrogen, comonomer, e.g., 1-hexene, if used, inert gas such as nitrogen, if used, and cocatalyst or catalyst component, e.g., TEAL, are fed to reactor 14 through line 25 after being combined with unreacted cycle gas leaving the top of reactor 14 through line 19 which is compressed in compressor 20, cooled in heat exchanger 26 and enters the bottom of reactor 14 through line 27. The gas velocity and size and density of the particles in reactor 14 are such as to form fluidized or dense bed 28 of bimodal polymer particles associated with the catalyst, including the transition metal primary catalyst component added to reactor 1. The conditions in reactor 14, e.g., partial pressure of ethylene, hydrogen/ethylene ratio and temperature, are controlled such that a relatively low molecular weight (LMW) polymer forms primarily on and within the HMW polymer/catalyst particles transferred from reactor 1. After a sufficient amount of LMW polymer has formed resulting in a bimodal polymer having a desirable molecular weight distribution and other properties, the polymer is transferred to discharge tank 29 by opening valve 30 while keeping valve 31 closed. After substantially all the polymer has been transferred to discharge tank 29, it is collected by closing valve 30 and opening valve 31, resulting in the pressure discharge of the final polymer product through line 32.

The following examples further illustrate the invention. The elasticity and viscosity values were all determined at 0.1 rad./sec.

EXAMPLE 1

A catalyst was prepared by reacting $MgCl_2$, tetrahydrofuran (THF) and $TiCl_3 \cdot 0.33 \, AlCl_3$ adding the resulting complex to dehydrated silica treated with sufficient triethylaluminum to react with the OH groups in the silica but not enough to function significantly as partial activator or cocatalyst, and drying the resulting silica supported catalyst precursor. The procedure used to prepare the catalyst was substantially that of Example 4 of U.S. Pat. No. 4,888,318 except that the partial activation of the supported magnesium and titanium precursor with tri-n-hexylaluminum and diethylaluminum chloride, as shown in the patent, was omitted. The free flowing catalyst powder contained the following weight percentages of components: Ti, 1.13; Mg, 1.95; Cl, 8.22; THF, 15.4; and Al, 1.41.

Using the foregoing catalyst, a gas phase, fluidized bed polymerization process was carried out using two reactors operating in the tandem mode as shown in the drawing. The process included the feeding of 1-hexene as comonomer and triethylaluminum (TEAL) as cocatalyst to both reactors. Nitrogen was used to control the total pressure in both reactors at about 300 psig. Averages of other conditions in both reactors, which were controlled to produce a HMW-HDPE bimodal resin suitable for being blown extruded into low gauge films with superior mechanical properties, are shown in Table I, wherein "$PC_2 =$" is the partial pressure of the ethylene, "$H_2/C_2$" is the molar ratio of hydrogen to ethylene, and "$C_6/C_2$" is the molar ratio of 1-hexene to ethylene in the gas phase.

TABLE I

|  | Reactor 1 (HMW) | Reactor 14 (LMW) |
| --- | --- | --- |
| Temp. (° C.) | 75 | 105 |
| $PC_2 =$ (psi) | 55–65 | 84–90 |
| $H_2/C_2$ | 0.03 | 2.0 |
| $C_6/C_2$ | 0.035–0.045 | 0.03 |
| TEAL (ppmw) | 290 | 190 |
| Resid. Time (hrs) | 2.8 | 3.6 |

The HMW polymer leaving reactor 1 was found by direct measurement to have a flow index ($I_{21}$) of 0.35 g/10 min., a flow ratio (FR) of 11, a dynamic elasticity of 0.56 at a complex viscosity of 4.1E6 ($4.1 \times 10^6$) poises, and a density of 0.931 g/cc, while the LMW polymer produced in reactor 14 was calculated from a single reactor process model to have a melt index ($I_2$) of about 400 g/10 min. and a density of 0.966 g/cc.

The granular bimodal polymer obtained from reactor 14 had a fraction of HMW component of 0.57. In this example and in Examples 2, and 4 to 7, the final polymer contained about 4 to 7 ppm of titanium ash. This is an indication of the amount of titanium precursor used in the process since substantially all the titanium in such precursor is present in the final polymer.

Using standard procedures and a Banbury mixer and Sterling extruder, the granular bimodal polymer from reactor 14 was compounded into pellets having a flow index ($I_{21}$) of 6.1 g/10 min., a MFR of 116, a density of 0.946 g/cc, and a dynamic elasticity of 0.598 at a corresponding complex viscosity of 1.1E6 poises. The rheological properties, i.e., of elasticity and viscosity, of the HMW component and the bimodal polymer blend were measured in the Rheometric System IV at 200° C. under dynamic oscillatory mode in parallel plate geometry.

The bimodal polymer pellets were blown extruded into films on a 50 mm Alpine extruder equipped with a grooved barrel extruder, a 100 mm die and 1 mm die gap. The other extruder conditions were: melt temp=416° F.; frost line height=36 inches; blow-up ratio=4.0; nominal film gauge= 0.5 mil; output=120 lbs./hr. The films were found to have a Dart Drop Impact ($F_{50}$) of 400 g and a MD Tear of 26 g/mil. Contrary to what is expected in the art, these properties were achieved despite the fact that the bimodal polymer was found to have a higher degree of short chain branching in the LMW component than in the HMW component.

EXAMPLE 2

The procedure of Example 1 was followed using slightly different process conditions as shown in Table II:

TABLE II

|  | Reactor 1 (HMW) | Reactor 14 (LMW) |
| --- | --- | --- |
| Temp. (° C.) | 75 | 105 |
| $PC_2 =$ (psi) | 68 | 86 |
| $H_2/C_2$ | 0.03 | 1.7 |
| $C_6/C_2$ | 0.04 | 0.04 |
| TEAL (ppmw) | 300 | 300 |
| Resid. Time (hrs) | 3.0 | 4.0 |

The HMW component leaving reactor 1 was found by direct measurement to have the following properties: $I_{21} =$ 0.45 g/10 min.; FR=10; dynamic elasticity=0.59 at a complex viscosity of 4.0E6; and density=0.931 g/cc; the LMW was calculated to have a melt index ($I_2$) of 450 (estimated from GPC) and a density of 0.964 g/cc; and the pellets prepared from the granular bimodal blend polymer from reactor 14 had the following properties: HMW weight fraction=0.57; $I_{21}$=6.7 g/10min.; MFR=106; dynamic elasticity=0.60 at a complex viscosity of 9.3E5 poises; and density=0.945 g/cc. Films prepared from the bimodal polymer blend as described in Example 1 had a Dart Drop Impact ($F_{50}$) of 406 g and an MD Tear of 28 g/mil.

EXAMPLE 3

A catalyst was prepared as follows: In part A of the preparation, 289.5 grams of Davison 955-800 silica having a nominal average particle size of 50 microns were transferred into a 4-neck 3-liter round bottom flask fitted with an overhead stirrer and under a slow purge of nitrogen. About 1500 ml of dry tetrahydrofuran (THF) were added to the flask which was placed into an oil bath set at 60–65° C. Next 184 ml of a 2.0 molar solution of ethylmagnesium chloride in THF was added dropwise using an addition funnel to the silica/THF slurry. After 10 minutes, the THF was removed by distillation to yield a white free flowing powder. The powder was dried for 16 hours under a slow nitrogen purge with the oil bath set at 80–85° C., and, except for 2 grams which were removed from the flask, constitute the part A product. The powder was found to contain 6.0 wt. % of THF.

In part B of the preparation, 1500 mls of heptane as received was placed into a 3-liter round bottom flask, and 162 ml of neat titanium tetrachloride was added dropwise to the heptane using an addition funnel. This solution was then siphoned into the part A product. The slurry was stirred for 1.5 hours with the oil bath at 80–85° C. after which the silica was allowed to settle and the reaction solution was decanted through a gas dispersion tube under a slight nitrogen pressure. The silica was then washed six times with about 1500 mls of dry hexane. After the last wash, the silica was dried with a nitrogen purge to yield 370 grams of a very light tan catalyst precursor. Analysis: Mg=2.52 wt. %, Ti=3.36 wt. %, THF=3.2 wt. %.

The foregoing catalyst was used to carry out a two stage, HMW first, gas phase fluidized bed process in the tandem mode as illustrated in the drawing and similar to that described in Example 1, under conditions such as to produce a high molecular weight, high density ethylene polymer film resin in accordance with this invention. As cocatalyst, triethylaluminum (TEAL) was fed to the first (HMW) reactor and trimethylaluminum (TMA) to the second (LMW) reactor. Ranges of reaction conditions employed are shown in Table III.

TABLE III

|  | Reactor 1 (HMW) | Reactor 14 (LMW) |
| --- | --- | --- |
| Temp. (° C.) | 75 | 98 |
| PC$_2$ = (psi) | 30 | 60 |
| H$_2$/C$_2$ | 0.03 | 2.4 |
| C$_6$/C$_2$ | 0.04 | 0.042 |
| TEAL (ppmw) | 330 | 0 |
| TMA (ppmw) | 0 | 660 |
| Resid. Time (hrs) | 5.0 | 4.0 |

The HMW polymer leaving reactor 1 was found by direct measurement to have the following properties: $I_{21}$=0.30 g/10 min.; FR=15: dynamic elasticity=0.66 at a complex viscosity of 4.2E6; and density=0.930 g/cc; the LMW component was calculated to have a melt index ($I_2$) of 550 (estimated from GPC) and an estimated density of 0.965 g/cc; and pellets prepared from the granular bimodal polymer from reactor 14 had the following properties: HMW weight fraction=0.57; $I_{21}$=8.8 g/10 min.; MFR=140; dynamic elasticity=0.587 at a complex viscosity of 9.5E5 poises; and density=0.945 g/cc. In addition, the polymer had a titanium ash content of about 12 to 18 ppm. Films prepared from the bimodal polymer blend as described in Example 1 had a Dart Drop Impact ($F_{50}$) of 387 g and a MD Tear of 22 g/mil.

EXAMPLE 4

HMW and LMW components intended to be physically blended in producing an HMW-HDPE bimodal polymer in accordance with this invention were separately prepared in a single stage gas phase reactor. The catalyst used to prepare the HMW component was the same as that described in Example 1. The catalyst used to prepare the LMW component was the catalyst of Example 1 subjected to prereduction or partial activation with tri-n-hexylaluminum, as cocatalyst. The procedure used to prepare the catalyst was substantially that of Example 4 of U.S. Pat. No. 4,888,318 except that the partial activation of the supported magnesium and titanium precursor was carried out with tri-n-hexylaluminum alone as partial activator rather than the latter together with diethylaluminum chloride as shown in the patent. The free flowing catalyst powder contained the following weight percentages of components: Ti, 1.07; Mg, 1.7; Cl, 7.5; THF, 14.3; and Al, 1.98.

Reactor conditions employed in the preparation of the two components are shown in Table IV.

TABLE IV

|  | HMW | LMW |
| --- | --- | --- |
| Temp. (° C.) | 80 | 98 |
| PC$_2$ = (psi) | 84 | 78 |
| H$_2$/C$_2$ | 0.02 | 1.72 |
| C$_6$/C$_2$ | 0.008 | 0.085 |
| TEAL (ppmw) | 400 | 400 |
| Resid. Time (hrs) | 2.0 | 2.0 |

The HMW component had the following properties: $I_{21}$=0.3 g/10 min.; FR=10; dynamic elasticity=0.64 at a complex viscosity of 5.0E6 poises; and density=0.935 g/cc; while the LMW component had a melt index ($I_2$) of 300 g/10 min. and a density of 0.950 g/cc.

A blend of the HMW and LMW components was prepared by melt mixing in a Banbury mixer with a conventional stabilizer package to prevent degradation. The blend had the following properties: HMW weight fraction=0.55; $I_{21}$=5.8 g/10 min.; MFR=90; density=0.942 g/cc; and dynamic elasticity=0.577 at a complex viscosity of 11.4E5 poises. A film prepared from the blend as described in Example 1 had a Dart Drop Impact ($F_{50}$) of 330 g and a MD Tear of 21 g/mil.

EXAMPLE 5

The procedure of Example 4 was followed except that the blend contained a weight fraction of 0.50 of the HMW fraction prepared in a ¾ inch Brabender twin screw extruder. The blend of HMW and LMW components had the following properties: $I_{21}$=7.7 g/10 min.; MFR=101; density=0.9424 g/cc; and dynamic elasticity=0.516 at a complex viscosity of 9.3E5 poises. The bimodal polymer blend could be formed into low gauge films as described in Example 1 having excellent mechanical properties, e.g., Dart Drop Impact and MD Tear.

EXAMPLE 6

The procedure of Example 5 was generally followed except that the catalyst of Example 1, which was not partially activated, was used to prepare both the HMW and LMW polymers, and the conditions in the HMW and LMW reactors were as shown in Table V.

TABLE V

|  | HMW | LMW |
| --- | --- | --- |
| Temp. (° C.) | 74 | 105 |
| $PC_2 =$ (psi) | 24 | 87 |
| $H_2/C_2$ | 0.018 | 1.44 |
| $C_6/C_2$ | 0.098 | 0.0002 |
| TEAL (ppmw) | 320 | 400 |
| Resid. Time (hrs) | 2.8 | 2.4 |

The HMW component had the following properties: $I_{21}$= 0.38 g/10 min.; FR=11; dynamic elasticity=0.615 at a complex viscosity of 4.16E6 poises; and density=0.926 g/cc; while the LMW component had a melt index ($I_2$) of 250 g/10 min. and a density of 0.960 g/cc.

A blend of the HMW and LMW components prepared as described in Example 4 had the following properties: HMW weight fraction=0.52; $I_{21}$=9.9 g/10 min.; MFR=115; density=0.942 g/cc; and dynamic elasticity=0.517 g/10 min. at a complex viscosity of 8.0E5 poises. A 1 mil film prepared from the blend as described in Example 1 had a Dart Drop Impact ($F_{50}$) of 387 g, a MD Tear of 26 g/mil., and a TD Tear (Elmendorf tear resistance in the transverse direction) of 57 g/mil.

EXAMPLE 7

The procedure of Example 6 was followed using the same HMW and LMW components except that such components were blended in a different proportion. The blend had the following properties: HMW weight fraction=0.58; $I_{21}$=5.7 g/10 min.; MFR=94; density=0.940 g/cc; and dynamic elasticity=0.522 at a complex viscosity of 10.2E5 poises. A 1 mil film prepared from the blend as described in Example 1 had a Dart Drop Impact ($F_{50}$) of 305 g, a MD Tear of 23 g/mil. and a TD Tear of 375 g/mil.

The results of the foregoing examples indicate that HMW-HDPE resins of this invention can be blown extruded into low gauge films having superior mechanical properties.

Before being formulated into films, the polymers of this invention may be compounded with various additives utilized in relatively minor amounts, e.g., other polymers such as conventional low-density polyethylene (LDPE) and recycled polyethylene, stabilizers, anti-oxidants, plasticizers, fillers, etc., as are well known in the art.

We claim:

1. A film comprising a polymer blend, the blend having:

a density of about 0.940 to 0.960 g/cc, a flow index ($I_{21}$) of about 4 to 12 g/10 min, MFR of about 75 to 180 , and a dynamic elasticity of about 0.45 to 0.65 at a corresponding complex viscosity of about $6 \times 10^5$ to $14 \times 10^5$ poise, wherein the blend consists essentially of:

at least about 0.5 weight fraction of a first component having a density of at least about 0.910 g/cc, a flow index ($I_{21}$) of no higher than about 0.8 g/10 min, a molecular weight distribution indicated by a flow ratio (FR) no higher than about 15, and a dynamic elasticity at 0.1 rad/s, of no higher than about 0.75 at a corresponding complex viscosity at 0.1 rad/s of no higher than about $7 \times 10^6$, and second component having a lower molecular weight than said first component and having a density of at least about 0.940 g/cc and a melt index ($I_2$) of at least about 100 g/10 min, wherein each of said first component and said second component is selected from the group consisting of a homopolymer of ethylene and at least one copolymer of a preponderance of ethylene with a minor amount of a 1-olefin containing 3 to 10 carbon atoms as comonomer, said film exhibiting a Dart Drop Impact resistance (F50,ASTM d 1709) of 250 to 600 g.

2. The film of claim 1 having a thickness up to 1.5 mil and a MD Tear of at least about 10 g/mil.

3. The film of claim 2 having a MD Tear of about 15 to 60 g/mil.

4. The film of claim 3 having a MD Tear of about 20 to 60 g/mil.

* * * * *